United States Patent [19]
Koo

[11] Patent Number: 5,793,421
[45] Date of Patent: Aug. 11, 1998

[54] APPARATUS FOR TESTING ORDERED TYPE VIDEO TERMINAL BY USING COMPUTER AND TESTING METHOD THEREFOR

[75] Inventor: Kyoung Bong Koo, Seoul, Rep. of Korea

[73] Assignee: Hyundai Electronics Industries Co., Ltd., Rep. of Korea

[21] Appl. No.: 455,038

[22] Filed: May 31, 1995

[30] Foreign Application Priority Data

Dec. 30, 1994 [KR] Rep. of Korea ............ 94-39844

[51] Int. Cl.[6] ............................................ H04N 17/00
[52] U.S. Cl. .................... 348/181; 348/192; 348/552; 395/183.09; 370/252
[58] Field of Search ............................ 348/180, 181, 348/192, 552; 395/183.04, 183.09; 370/13; 391/20.1, 22.1, 22.3; 379/241, 252; H04N 17/00

[56] References Cited

U.S. PATENT DOCUMENTS

| | | | |
|---|---|---|---|
| 4,569,049 | 2/1986 | McNamara | 371/25 |
| 4,810,958 | 3/1989 | Magi et al. | 371/20 |
| 5,121,342 | 6/1992 | Szymborski et al. | 375/10 |
| 5,285,199 | 2/1994 | Pocek | 370/252 |
| 5,301,207 | 4/1994 | Emerson et al. | 370/252 |
| 5,440,339 | 8/1995 | Harrison et al. | 348/181 |
| 5,493,562 | 2/1996 | Lo | 370/252 |

FOREIGN PATENT DOCUMENTS 1-245649  9/1989  Rep. of Korea ............ H04M 3/24

*Primary Examiner*—John K. Peng
*Assistant Examiner*—Jeffrey S. Murrell
*Attorney, Agent, or Firm*—Wigman, Cohen, Leitner & Myers, P.C.

[57] ABSTRACT

An apparatus for testing video ordered type terminals by using a computer, and a testing method therefor, employ a personal computer and a bit stream board of the computer to form a virtual server of an ordered type video terminal testing system, thereby making it easier to test a video terminal. In the conventional apparatus for testing an ordered type video terminal, a server is required in order to test such a terminal. This server includes a memory system of a large capacity and computer capable of carrying out a high speed arithmetic operation. Therefore, its installation and movement are not easy, while its price is very high. Accordingly, it is uneconomical to procure it only for testing purposes. Therefore, the present invention provides an apparatus for testing a video terminal, in which a personal computer, an RS-232C interface normally used in the personal computer, and a bit stream board installed in a slot of the computer are utilized to form a virtual server, thereby making it easy to test a video terminal. The testing system of the present invention is economical, and is not restricted by time and place compared with the case of using the expensive server.

16 Claims, 1 Drawing Sheet

APPARATUS FOR TESTING ORDERED TYPE VIDEO TERMINAL BY USING COMPUTER AND TESTING METHOD THEREFOR

FIELD OF THE INVENTION

The present invention relates to an apparatus for testing ordered type video terminals by using a computer, and a testing method therefor, in which a personal computer and a bit stream board of the computer are utilized to form a virtual server of terminal testing system, thereby making it easier to test a video terminal.

DESCRIPTION OF THE PRIOR ART

Generally, in the service, data of a moving picture experts group (to be called "MPEG" below) are received from a server through a high speed data channel, and control information is given and taken through a control channel. Therefore, in order to test such a terminal, a server is required. This server includes a memory system of large capacity and a computer capable of carrying out a high speed arithmetic operation. Therefore, its installation and movement is not easy, while its price is very high. Accordingly, it is uneconomical to procure it only for testing purpose.

Meanwhile, a technique for testing a particular apparatus to be tested is disclosed in Japanese Patent Laid-open No. Hei-1-245649. The apparatus employing this technique includes a battery as an internal power source, and an audible sound generator for audibly displaying the frame synchronization establishment of the digital subscribers to be tested. The audible sound generator includes: a power switch; a battery lead for receiving the battery power; an LED for turning on the power switch; an audible display buzzer for detecting the frame synchronization, and for lighting the display LED; a jack; a bit pattern transmitting circuit; a synchronization detecting circuit; an analyzing circuit; and a NAND gate for NANDing the outputs of the above mentioned circuits to control the buzzer.

By providing the testing apparatus constituted as described above, the following results are gained. That is, conventionally, the test was performed in such a manner that the actual network crossing apparatus within an integrated services digital network (ISDN) used a universal protocol analyzer to display the result. However, with the above described apparatus, a portable digital subscriber line testing apparatus is used, so that the frame synchronization establishment of the ISDN digital subscriber can be tested in a simple manner.

However, in the above, described technique, a personal computer and a bit stream board installed within the personal computer are used to emulate a server as an terminal testing system, so that the role of the existing test system network and the server for the control channel are carried out by the computer. Meanwhile, the function of transmitting the bit stream of the moving picture experts group (MPEG) from the server is carried out by the bit stream board installed in the slot of the computer. Therefore, this video terminal testing apparatus is different from the technique of the present invention in that a video terminal can be tested in any time, even without the expensive server.

That is, the apparatus of the prior art is similar to the apparatus of the present invention in that an apparatus is provided for testing a certain object to be tested. However, the constitutions of the apparatuses are different from each other, and the objects to be tested are different from each other. Therefore, a mutual adaptation is impossible.

SUMMARY OF THE INVENTION

The present invention is intended to overcome the above described disadvantages of the conventional technique.

Therefore it is an object of the present invention to provide an apparatus for testing terminal, in which a personal computer, an RS-232interface normally used in the personal computer, and a bit stream board installed in a slot of the computer are utilized to form a virtual server, thereby making it easy to test the video terminal.

In achieving the above object, the apparatus for testing terminals according to the present invention includes: a personal computer for storing network and control data into its hard disc to furnish the data to an RS-232C line; a slot formed in the personal computer; a first-in, first-out (FIFO) memory for storing the data outputted from the hard disc of the computer; a memory for use when downloading the data of the hard disc of the computer; a multiplexer (MUX) for selectively outputting the data outputted from the FIFO and the memory; a shift register for converting the output data of the MUX into a serial bit stream; a T1 signal generator for arranging the converted bit stream output data into a T1 signal format; and a bit stream board consisting of a controller for controlling the respective sections, whereby terminal is tested.

In achieving the above object, the method for testing terminal according to the present invention is characterized in that: a bit stream board is installed in a personal computer; the personal computer and the terminal are connected through an RS-232C interface to a serial communication port and; a high speed data channel for receiving an MPEG bit stream is connected through a T1 line to the bit stream board installed in the slot of the computer, whereby the conventional roles of the network and the server for the control channel are carried out by the computer, and the function of transmitting the MPEG bit stream from the server is carried out by the bit stream board.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
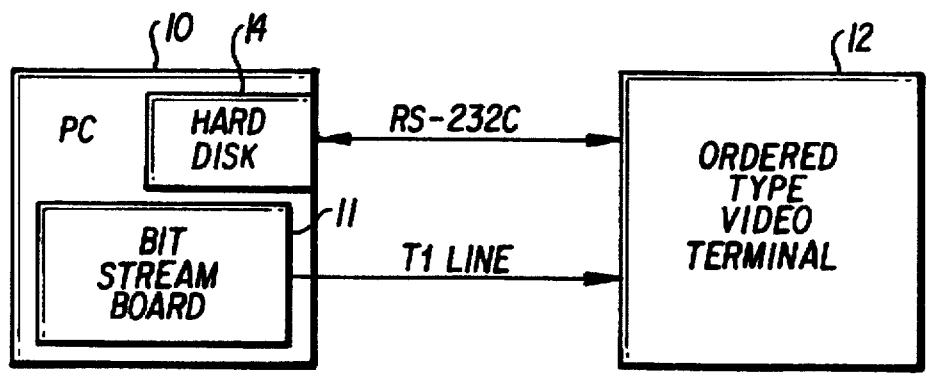
FIG. 1 is a block diagram showing the constitution of the apparatus according to the present invention.

FIG. 1 is a block diagram showing the constitution of the apparatus according to the present invention.

As shown in this drawing, the apparatus for testing terminals according to the present invention includes: a personal computer 10 for storing network and control data into its hard disc 14 to furnish the data to an RS-232C line; a bit stream board 11 installed within the personal computer 10; and terminal 12 to be tested.

The terminal 12 is connected through an RS-232C interface to a serial port of the computer, while a high speed channel for receiving an MPEG bit stream is connected through a T1 line to the bit stream board 11 which is installed in a slot of the personal computer 10.

Figure 2:
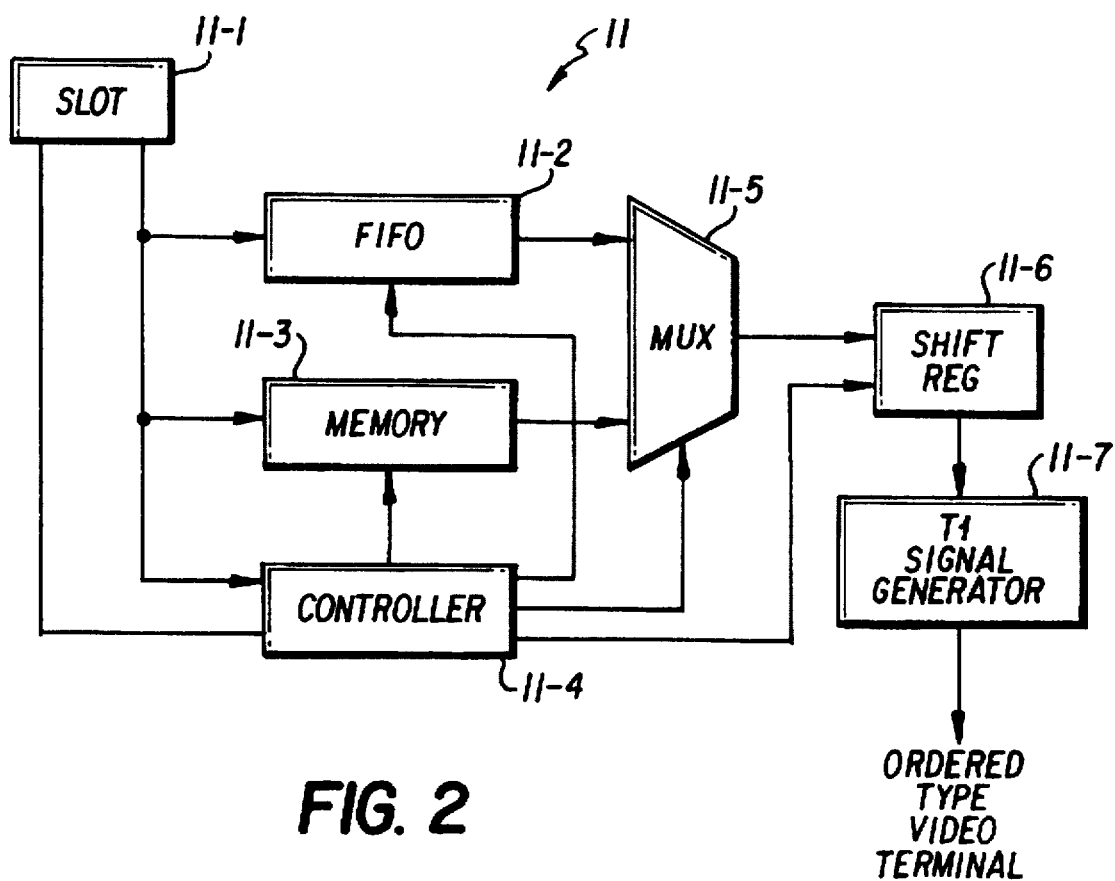
FIG. 2 is a block diagram showing the detailed constitution of the bit stream board.

As shown in FIG. 2, the bit stream board 11 is installed in a slot 11-1 formed in the personal computer 10 and includes:

a FIFO 11-2 for storing the data outputted from the hard disc 14 of the computer 10; a memory 11-3 for use when downloading the data of the hard disc 14 of the computer 10; a MUX 11-5 for selectively outputting the data outputted from the FIFO 11-2 and the memory 11-3; a shift register 11-6 for converting the output data of the MUX 11-5 into a serial bit stream; a T1 signal generator 11-7 for arranging the converted bit stream output data into a T1 signal format to transmit it to the terminal 12; and a controller 11-4 for controlling the respective sections.

There are two methods of transmitting the final output signals from the bit stream board 11 to the terminal 12, and the methods are as follows.

A first one of the methods, the signals are transmitted from the hard disc 14 of the computer 10 through the FIFO 11-2 with real time.

In a second method, the signals are transmitted after all the data are downloaded from the hard disc 14 of the computer 10 to the memory 11-3.

The second method is used for the case where testing is carried out for all the functions of the terminal such as a control function through a control channel, an MPEG data decoding function, and the like. The above two methods are carried out under the control of the controller 11-4.

Therefore, according to the present invention, the conventional roles of the network and the server for the control channel are carried out by the computer 10, and the function of transmitting the MPEG bit stream from the server is carried out by the bit stream board 11 which is installed within the personal computer 10. Of course, the transmitting function of the bit stream board 11 is carried out under the control of the personal computer 10.

Thus the present invention departs from the conventional practice in which an expensive server is used in carrying out the test. Instead, only a bit stream board is installed in the personal computer to substitute for the expensive server. Therefore the economy of the test is greatly improved.

Further, the present invention is superior in its convenience and maneuverability compared with the conventional method, in that the test can be carried out at any time without being restricted by time and place.

According to the present invention as described above, a virtual server is formed, thereby testing terminal in which the control information is transacted between the network and server. Therefore, the testing in the present invention is economical, and is not restricted by time and place.

What is claimed is:

1. An apparatus for testing an ordered type video terminal, comprising:
   a personal computer having a hard disc for storing network and control data and for furnishing said network and control data via an RS-232C line to a control channel of the ordered type video terminal, said personal computer including a slot; and
   a bit stream board disposed in the slot of said personal computer for converting stored data into a bit stream of T1 signal format so as to furnish the bit stream to a data channel of the ordered type video terminal through a T1 line;
   wherein said bit stream board includes:
   a first-in, first-out memory (FIFO) for storing data output provided by said hard disc through said slot,
   a memory for storing MPEG data downloaded from said hard disc through said slot,
   a multiplexer (MUX) for selectively outputting a data output from said FIFO and from said memory,
   a shift register for converting said output data of said MUX into a serial bit stream,
   a controller for selectively controlling the FIFO, the memory, the MUX and the shift register, and
   a T1 signal generator for arranging the converted bit stream output data into the bit stream of T1 signal format to match the data channel of the ordered type video terminal.

2. An apparatus for testing an ordered type video terminal, comprising:
   a personal computer having a hard disc for storing network and control data, MPEG data, and control software; and
   a bit stream board installed in the personal computer;
   wherein said personal computer has a serial communication port and said ordered type video terminal has a control channel, said serial communication port being connected via an RS-232C line to said control channel; and
   wherein said ordered type video terminal has a high-speed data channel for receiving said MPEG data in the form of an MPEG bit stream, said high-speed data channel being connected via a T1 line to an output of said bit stream board;
   whereby the conventional roles of a network and a server for the control channel of the ordered type video terminal are carried out by the serial communication port of said computer, and the function of transmitting the MPEG bit stream is carried out by said bit stream board.

3. The apparatus of claim 2, wherein said bit stream board comprises a first-in, first-out memory (FIFO) for storing data from said hard disc of said computer in real time, whereby an MPEG data decoding function is tested.

4. The apparatus of claim 2, wherein said bit stream board comprises a memory for storing downloaded MPEG data from said hard disc of said computer, whereby an MPEG data decoding function of said ordered type video terminal and at least one control function of said ordered type video terminal are tested.

5. An apparatus for testing an ordered type video terminal having a control channel and a high-speed data channel, said apparatus comprising:
   a personal computer having a hard disc and a bit stream board;
   serial port means for interconnecting said hard disc and said control channel, and for providing network and control data from said personal computer to said control channel; and
   T1 signal line means interconnecting said bit stream board and said high-speed data channel for providing MPEG bit stream data to said high-speed data channel;
   wherein said bit stream board is installed in a slot of said personal computer for receiving data downloaded from said hard disc.

6. The apparatus of claim 5, wherein said bit stream board comprises memory means for receiving and storing said downloaded data from said hard disc.

7. The apparatus of claim 6, wherein said bit stream board further comprises additional memory means for receiving and storing a data output of said hard disc in real time.

8. The apparatus of claim 7, wherein said bit stream board further comprises multiplexer means connected to said memory means and to said additional memory means for selectively providing data from said memory means and said additional memory means as an output of said multiplexer means.

9. The apparatus of claim 8, further comprising shift register means connected to said multiplexer means for converting the output of said multiplexer means into a serial bit stream.

10. The apparatus of claim 9, further comprising signal generator means connected to said shift register means for converting the serial bit stream from said shift register means into a T1 signal format.

11. The apparatus of claim 6, further comprising shift register means for receiving data from said memory means, and for converting said data from said memory means into a serial bit stream.

12. The apparatus of claim 11, further comprising signal generator means connected to said shift register means for converting said serial bit stream into a T1 signal format.

13. A method for testing an ordered type video terminal, comprising the steps of:

providing a personal computer having a hard disc;

installing a bit stream board in said personal computer;

connecting said hard disc via a serial port to a control channel of said ordered type video terminal; and connecting said bit stream board via a T1 signal line to a high-speed data channel of said ordered type video terminal;

wherein said bit stream board is installed in a slot of said personal computer, said method further comprising the steps of:

providing a first memory and a second memory connected to said slot;

transmitting a data output of said hard disc via said slot to said first memory in real time;

transmitting downloaded data from said hard disc via said slot to said second memory;

selectively using said data transmitted to said first memory to test all functions of said ordered type video terminal device; and selectively using said data transmitted to said second memory to test MPEG functions of said ordered type video terminal.

14. The method of claim 13, further comprising the step of providing a multiplexer connected to respective outputs of said first and second memories for selectively providing data from said first and second memories as an output of said multiplexer.

15. The method of claim 14, further comprising the step of converting said output of said multiplexer into a serial bit stream.

16. The method of claim 15, further comprising the step of converting said serial bit stream into a T1 signal format.

* * * * *